T. A. FIDJELAND.
ADJUSTING DEVICE FOR TELESCOPES.
APPLICATION FILED JUNE 6, 1913.

1,086,037.

Patented Feb. 3, 1914.

Witnesses:
John C. Sanders
Albert F. Neuman

Inventor:
T. Aa. Fidjeland
by Wm Wallace White
Attorney

UNITED STATES PATENT OFFICE.

TERJE AANENSEN FIDJELAND, OF FASTVEDT, IVELAND, CHRISTIANSAND, NORWAY.

ADJUSTING DEVICE FOR TELESCOPES.

1,086,037.   Specification of Letters Patent.   Patented Feb. 3, 1914.

Application filed June 6, 1913. Serial No. 772,068.

*To all whom it may concern:*

Be it known that I, TERJE AANENSEN FIDJELAND, gunmaker, subject of Norway, residing at Fastvedt, Iveland pr. Christiansand, Norway, have invented new and useful Improvements in Adjusting Devices for Telescopes, of which the following is a specification.

Telescopes are adjusted to different eyes usually by an adjustment of the eye-piece in a longitudinal direction of the telescope. In field-glasses or other hand-glasses this sort of adjustment is not felt as any remarkable drawback. Otherwise is the case as to aiming-telescope for guns. In this connection it is highly important that all movable parts are incased so that most possibly the outer parts remain firmly fast on the object in question and in relation to each other, for all such outer movable parts may in the field frequently be subjected to alter their position or be injured, whereas the risk thereof is of course considerably less as regards the parts or organs that may be considered as a compact mass. Consequently telescopes of the usual construction, *i. e.* with a variable length, must be considered as being less suitable as aiming devices for guns.

The present invention has for its object to provide a telescope of such a construction that it has fixedly arranged eyepiece and object-glass and may nevertheless be readily and safely adjusted to different eyes.

Figure 1:
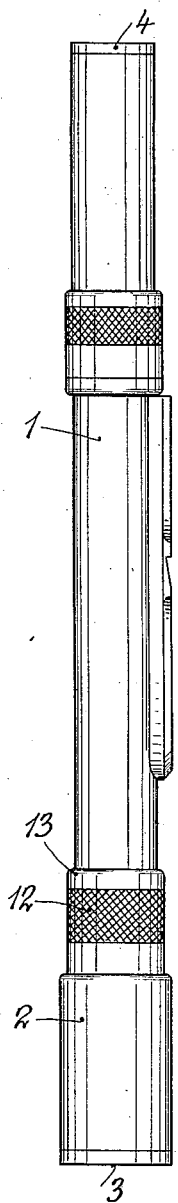
Figure 2:
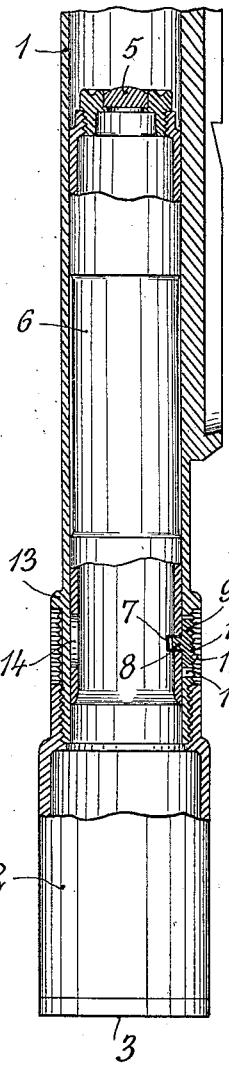
Figure 4:
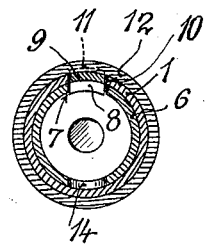
Figure 3:
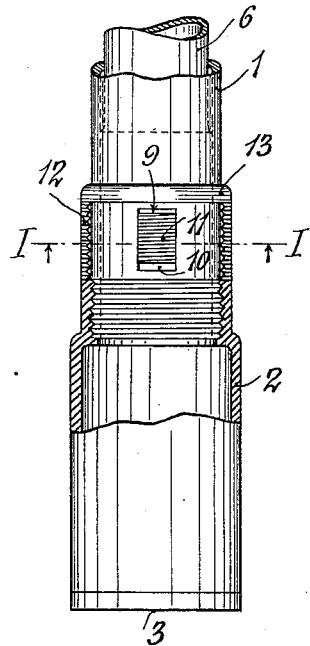

The invention is illustrated in the accompanying drawing, in which:

Figure 1 is an outside view of the telescope, and Fig. 2 is a portion of the same partly in longitudinal section. Fig. 3 shows the lower half of Fig. 2 seen from the underside and drawn to a larger scale, and Fig. 4 is a cross section on the plane I—I in Fig. 3.

As shown in Fig. 1 the telescope is provided with a long outer tube —1— and a short tube —2— screwed upon its end (Fig. 2), which parts are firmly connected with each other and may, if necessary, be locked together by a set screw or the like. The drawing shows by way of example a hand-fire-arm aiming-telescope with eyepiece at —3— and object-glass at —4—. Eyepiece as well as object-glass, respectively the compound lenses or lens systems for same, are firmly located in the tube, —1, 2—, so that the same obtains an invariable length. But in accordance with the present invention the inner reversing lens —5— (or compound lens or system) is adjustable, and it is this part that enables the adjustment of the telescope to different eyes. For this purpose the lens —5— is fixed in a tube —6—, inserted comparatively narrowly in the tube —1— in such a manner that it may be displaced within the latter by a mechanism to be manipulated from the outside.

As shown in Fig. 2 the lens tube —6— is provided at its lower end with a side aperture —7—, into which projects a tooth or rib —8— on a metal piece —9— inserted with a free space in an opening —10— in the telescope tube —1— and provided at its outer side with thread portions —11— corresponding to the inwardly cut threads on a sleeve —12— turnable around the tube —1—. This sleeve is outwardly knurled (see Fig. 1) and is prevented from being displaced longitudinally by abutting against a collar —13— on the outside of tube —1— and against the end edge of tube —2— as clearly shown in Figs. 2 and 3.

When the sleeve —12— which is not movable longitudinally is rotated on the tube —1—, it will force the piece —9— and through its tooth 8 the tube —6— with lens —5— to move in the tube —1— longitudinally, whereby the necessary adjustment of the lenses takes place.

Hereby is obtained an adjusting device which has only inwardly movable parts the sleeve —12— alone being rotatable and lying flush with the tube —1— and —2—, so that it can not cause drawbacks of the kind mentioned in the preamble. Further it is seen, that the parts, in case of revision or repairs, cleaning, etc., may be easily separated. For this purpose it is only required that the tube —2— be screwed off, thereafter the sleeve —12— be screwed off and then the piece —9— may be taken out of the apertures —7, 10,— and finally the tube —6— is pulled out by putting a finger into a side-hole —14— (Fig. 2) in the said tube.

The arrangement of parts described may be advantageously employed not only in aiming-telescopes but in the whole in any telescope in which it is important to prevent a variation of the length of the telescope tube.

Having now described my invention, what I claim as new and desire to secure by Letters Patent is:

1. In telescopes, in combination, a main tube, an object glass and an eyepiece fixedly supported in said tube, a movable tube positioned within said main tube, a reversing lens supported thereby, a rotatable sleeve surrounding said main tube, and means operatively engaging said sleeve and adapted to be moved longitudinally of said outer tube when said sleeve is rotated, said means being operatively connected to said movable tube, whereby said movable tube will be moved relatively to said main tube by the rotation of said sleeve.

2. In telescopes, in combination, a main tube, an object glass and an eyepiece fixedly supported in said tube, a movable tube positioned within said main tube, a reversing lens supported thereby, a rotatable sleeve surrounding said main tube, the inner surface of said sleeve being threaded, said main tube being provided with an aperture positioned under said sleeve and a member within said aperture adapted to move longitudinally with respect to said main tube, said member being provided with portions of threads engaging the threads on said sleeve and with a portion engaging said movable tube, whereby rotation of said sleeve will move said movable tube relatively to said main tube.

In testimony whereof I have signed my name to this specification in the presence of two subscribing witnesses.

TERJE AANENSEN FIDJELAND.

Witnesses:
JOHAN ALLUM SCHWARTZ,
PEDER T. BIRKELAND.

---

Copies of this patent may be obtained for five cents each, by addressing the "Commissioner of Patents, Washington, D. C."